(12) United States Patent
Huynh

(10) Patent No.: US 10,924,464 B2
(45) Date of Patent: *Feb. 16, 2021

(54) AUTOMATIC CREDENTIAL ROTATION

(71) Applicant: Amazon Technologies, Inc., Reno, NV (US)

(72) Inventor: Toan Huynh, Castro Valley, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,400

(22) Filed: Aug. 26, 2019

(65) Prior Publication Data

US 2020/0036693 A1   Jan. 30, 2020

Related U.S. Application Data

(63) Continuation of application No. 15/651,804, filed on Jul. 17, 2017, now Pat. No. 10,397,207.

(51) Int. Cl.
*H04L 29/06* (2006.01)

(52) U.S. Cl.
CPC .......... *H04L 63/068* (2013.01); *H04L 63/083* (2013.01)

(58) Field of Classification Search
CPC ........................... H04L 63/068; H04L 63/083
See application file for complete search history.

(56) References Cited

U.S. PATENT DOCUMENTS

| | | | |
|---|---|---|---|
| 6,985,583 B1 | 1/2006 | Brainard | |
| 10,397,207 B1 | 8/2019 | Huynh | |
| 2010/0100948 A1 | 4/2010 | Delia | |
| 2010/0180324 A1 | 7/2010 | Karur | |
| 2013/0291080 A1 | 10/2013 | Somerfield | |
| 2014/0282978 A1* | 9/2014 | Lerner | H04L 63/083 726/7 |
| 2015/0098564 A1 | 4/2015 | Chamley | |
| 2016/0104154 A1* | 4/2016 | Milov | G06Q 20/3674 705/67 |
| 2016/0212141 A1 | 7/2016 | Banerjee | |

(Continued)

OTHER PUBLICATIONS

Notice of Allowance and Fees Due issued in U.S. Appl. No. 15/651,804 dated Apr. 17, 2019.

(Continued)

*Primary Examiner* — Brandon S Hoffman
*Assistant Examiner* — William A Corum, Jr.
(74) *Attorney, Agent, or Firm* — Hogan Lovells US LLP

(57) ABSTRACT

Credentials and other sensitive strings can undergo automatic rotation before each transmission or storage of those credentials. String modification, which can utilize a key stretching algorithm, can be used to modify the credential before transmission. This can be for an initial sign up, a subsequent login, or another such action. A random number can be generated to determine the number of iterations for the key stretching algorithm to be applied. For subsequent actions, a new random number can be added to the prior iteration number in order to create a new string that can be generated using the previously utilized iteration number and the new random number, with only the new random number being transmitted with the modified credential string. This increases security, as the transmission itself cannot be used to recover the original plaintext credential if recovered.

20 Claims, 5 Drawing Sheets

(56) References Cited

U.S. PATENT DOCUMENTS

2017/0063393 A1* 3/2017 Shelton .................. G06F 21/31
2017/0091441 A1   3/2017 Moore, Jr.
2018/0034802 A1   2/2018 Shelton
2018/0343107 A1  11/2018 Resch
2018/0343283 A1  11/2018 Goutal

OTHER PUBLICATIONS

Percival et al., The scrypt Password-Based Key Derivation Function, Aug. 2016, Internet Engineering Task Force (IETF) Request for Comments: 7914.

B. Kaliski, PKCS #5: Password-Based Cryptography Specification Version 2.0, Sep. 2000, Network Working Group Request for Comments: 2898.

* cited by examiner

AUTOMATIC CREDENTIAL ROTATION

CROSS REFERENCE TO RELATED APPLICATIONS

This application is a Continuation of U.S. patent application Ser. No. 15/651,804, filed with the U.S. Patent and Trademark Office on Jul. 17, 2017, entitled "AUTOMATIC CREDENTIAL ROTATION," the entirety of which is incorporated herein, by reference, for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. These credentials can potentially be obtained by unintended third parties, who can gain unauthorized access to the resource environment, as well as the data and content stored therein. In order to minimize this potential problem, credentials can be given a limited lifetime such that any third party obtaining the credentials will only be able to use those credentials for their remaining lifetime. There is a tension in such an approach, however, as it is desirable to make the lifetime as short as possible to minimize the amount of time an unauthorized party obtaining the credentials can use them, but frequently having to obtain new credentials can be undesirable to a user, particularly when used for long tasks that may be difficult to complete if the credentials expire during the task.

BRIEF DESCRIPTION OF THE DRAWINGS

Various embodiments in accordance with the present disclosure will be described with reference to the drawings, in which.

DETAILED DESCRIPTION

Figure 1A:
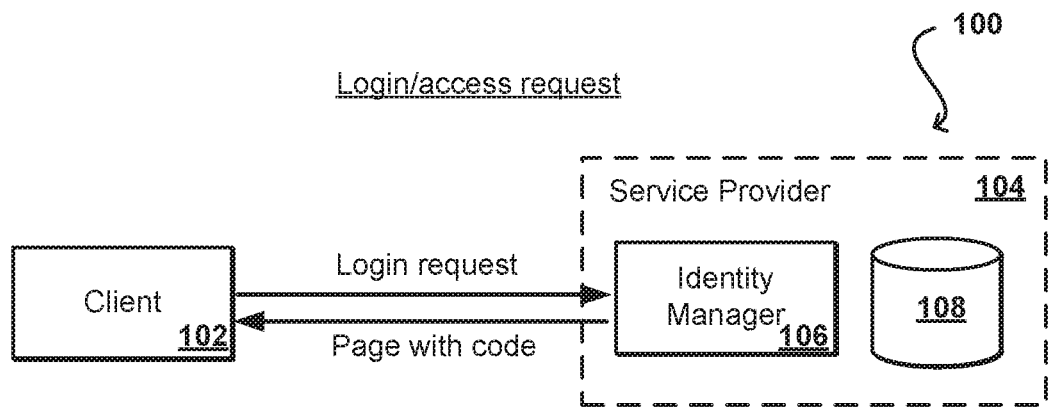
FIGS. 1A, 1B, and 1C illustrate an example approach to automatically rotating credentials that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of security credentials, and other sensitive data, in an electronic environment. In particular, various approaches provide for the automatic rotation of credentials before each transmission or storage of those credentials. In various embodiments, a string modification process such as may utilize a key stretching algorithm can be used to modify a credential (or other sensitive data string) each time the credential is to be transmitted. This can be for an initial sign up, a subsequent login, or another such action. A random number can be generated to determine the number of iterations that the key stretching algorithm should be applied to the string for the particular transmission. For subsequent actions, the random number (also referred to herein as an "additive number") can be added to the prior iteration number in order to create a current iteration number, which can determine the number of iterations to be used to generate a new modified string, with only the new random number being transmitted with the modified credential string. This increases security, as the transmission itself cannot be used to recover the original plaintext credential if recovered. If the iteration number becomes too large, the iteration number can be reset such that a new random number will represent the total number of iterations to be applied to the credential string.

Various other such functions can be used as well within the scope of the various embodiments as would be apparent to one of ordinary skill in the art in light of the teachings and suggestions contained herein.

As mentioned, users are increasingly accessing resources and data through various networks. Many of these users will have online accounts that are used to determine access permissions for the various resources and data. As the access can be used to handle sensitive matters, security is of increasing concern. Users often gain access to resources under such an account using credentials such as a username and password pair. While the data may be encrypted, an unauthorized third party obtaining a copy of the credentials can use the credentials to gain unauthorized access to the data and/or resources secured by the credentials. In order to minimize the potential impact of compromised credentials, users can be asked to periodically rotate their credentials. This is not optimal for the users, however, as they not only need to manually select new credentials at these times, but the users also must remember the current credentials. Further, the storage of these credentials in the resource environment can expose these credentials to potential theft or exposure to someone gaining access to that environment.

Figure 1B:
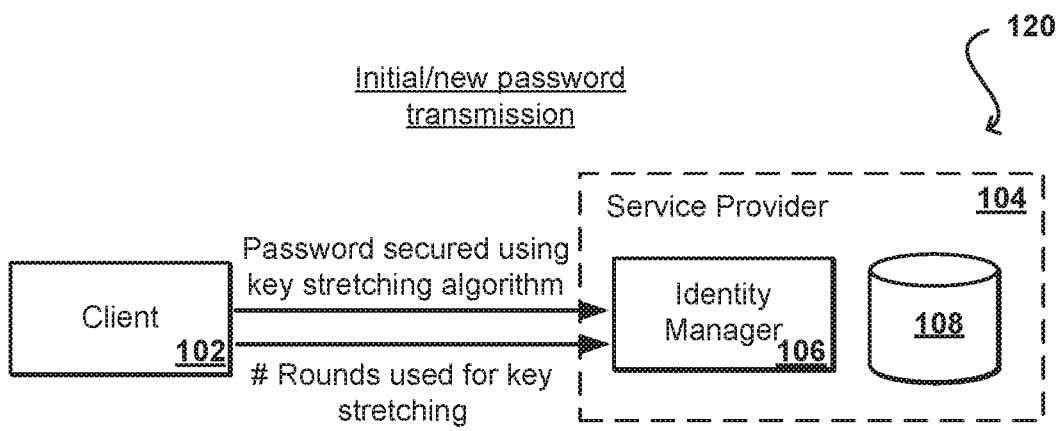
Figure 1C:
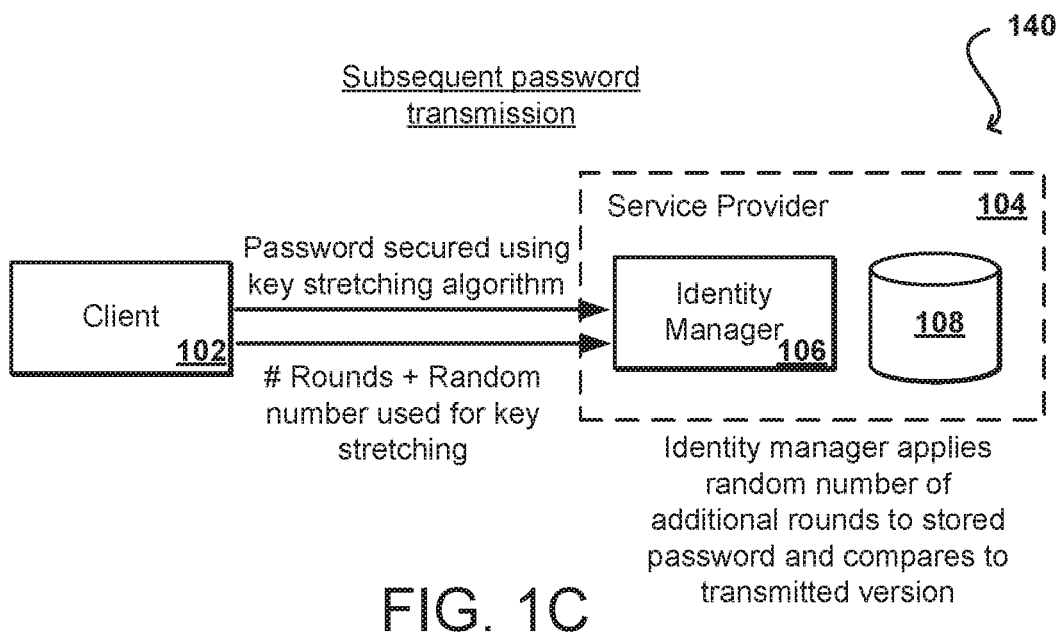

Accordingly, approaches in accordance with various embodiments provide for automated credential rotation whereby the credentials transmitted and stored can be different for each transmission, but the actual password to be remembered and entered by the user does not necessarily need to change unless otherwise requested for periodic password rotation or as desired by the user. FIGS. 1A through 1C illustrate one such approach that can be utilized in accordance with various embodiments. In the approach 100 illustrated in FIG. 1A, a user may use a client device 102 to send an initial login request, or request for access, to resources hosted in a service provider environment 104, or other such shared resource or multi-tenant environment. In response to the request, an identity manager 106 or other such component or sub-system may transmit a console or login page, which can include code to be used to transform any user access credentials (or other sensitive data as discussed herein) before those credentials are sent to the service provider environment. As mentioned elsewhere herein, however, the code in some embodiments may be stored on the device or contained within an application executing on the device, among other such options. Once the page is obtained, the client device 102 can be used to enter or provide the relevant information used to identify the user. The page can also request user credential information to be used to authenticate the user and gain access to the services permitted under the user account. In many instances, the credentials can include a username, which can be selected by the user or provided by the service provider or identity manager 106, among other such options. The credentials can also include a password, PIN, or other alphanumeric string that can be used to authenticate the user. In many cases a user will enter a plaintext password (or other credential not subjected to key stretching or other modification) into the page displayed on the client device 102.

As mentioned, however, it can be desirable to secure the credentials before the credentials are transmitted from the client device 102 to the service provider environment 104 as illustrated in the example approach 120 of FIG. 1B. In a conventional user authentication scheme, the plaintext password would be transmitted to the identity manager 106, possibly in encrypted form, and the plaintext password can then be decrypted and stored in a user repository 108 in the service provider environment. The credential value would typically not change absent user intervention, such as where the user provides a new credential as part of a manual password rotation process. In order for the user to subsequently login, the user would provide the credentials that would then be sent to the service provider environment 104 and authenticated by the identity manager 106, which can be part of, or external to, the service provider environment. The identity manager 106 can decrypt the credential and compare the received credential to the stored credential. If the credentials match, such as by corresponding to the same alphanumeric string, then the authentication can be successful and access granted per permissions granted under the user account.

In a situation where a credential is transmitted in such a way, however, the credential is exposed to attack in at least two stages: during transit and after being stored to the service provider environment, whether in a repository, on a server, or otherwise. For example, plaintext passwords can be leaked in case of a Transport Layer Security (TLS) protocol failure. Passwords stored on a server can also be leaked if the server is compromised or under attack. Even though the credential values stored on the server may not be the plaintext passwords, but encrypted versions of those passwords, the encryption algorithms are generally stored on the same server, which can potentially simplify the work needed for the hacker to reverse engineer and obtain the plaintext passwords. In such situations, setting a new password is usually needed. Doing so for several accounts can be difficult if a single user has accounts across hundreds of websites. First, it is very difficult to know exactly which account is compromised. Second, the time and effort needed to go through each account and change its password is preventative.

Even in situations where a server has not been hacked, many account management companies require users to rotate their passwords periodically. This can help prevent a user from using the same password across all the user's accounts, decreasing the chance that a breach on an unrelated site will impact another account. However, there are also downsides for manual password rotation. The users will have to remember many different passwords, each of which changes over time. As a result, users tend to choose weaker passwords to begin with, and then change them in predictable ways that attackers can easily guess. This can make the password rotation not as beneficial as expected.

Accordingly, an automatic password rotation scheme can be used that differs from conventional schemes in at least two aspects, including what is transmitted and what is stored for a user. Unlike a conventional password authentication scheme where the plaintext credential is transmitted to, and stored in, a service provider environment, approaches in accordance with various embodiments can utilize a string modification algorithm to modify the credential before transmission. In the example approach 120 of FIG. 1B, a key stretching algorithm is used to modify the credential string before the credential is transmitted. An entity obtaining a copy of the credential would then need to know the correct key stretching algorithm in order to revert back to the original credential string. Further, a key stretching algorithm can be used in an iterative fashion that goes through a specified number of rounds of modification. For example, a random number between one and twenty might be selected, and the key stretching algorithm would operate on the credential string the determined number of times. For such an approach, a party obtaining the modified credential would also have to obtain the correct number of rounds by which the algorithm was applied in order to uncover the actual plaintext credential. Thus, as illustrated in FIG. 1B, the code sent, or otherwise available, to the client device can process the credential string using the identified key stretching algorithm over the randomly generated number of rounds. As an example, the password "Password" processed using ten iterations of a BCrypt key stretching algorithm could produce a modified credential string such as:

$2a$10$wRC6pEdnKi9y8hh.RJvrl.GjcGxPrMrBW2pJ
vqSXrIWOdL52VR3Za

The modified credential (e.g., the string above) and the number of rounds (e.g., ten) can then be transmitted to the service provider environment. In some embodiments the string and the number of rounds can be sent in separate transmissions to further increase security. The modified string and the number of rounds can then be stored to the user data repository 108, or other such location, in the service provider environment 104. In this example, the plaintext string is never stored, although in some embodiments the plaintext string could be determined and stored if worried primarily about transmission instead of storage.

Such an approach can provide for an automatic manipulation of the string that prevents the actual plaintext password from being transmitted and stored. It can still be desirable, however, to rotate the credential such that if someone obtains the modified credential and number of rounds that the resulting plaintext credential will only be useful until the rotation takes effect. Accordingly, an approach 140 can be used such as that illustrated in FIG. 1C, wherein a similar process is used for a subsequent transmission of the credential. While there are different ways to encrypt plaint text passwords, the use of key stretching algorithms can convert short plaintext passwords into longer and more random keys for cryptographic purposes. Key stretching algorithms can accept a to-be-stretched string and an iteration count as input. The output from each iteration can then become the input for the next iteration and go through the same mathematical manipulation for the number of iterations that equals the iteration count. Any appropriate key stretching algorithm, such as a hash-based or block-cipher-based, a stream-based cipher, a pseudo random function (PRF), or a pseudo random permutation (PRP), can be used in such a process. Salting may also be used in conjunction with key stretching in order to increase the computational complexity and therefore enhance the security level. The final output of key stretching, instead of the plain text password, can be transmitted to the server and stored, together with the iteration count information. For subsequent transmission for a subsequent login event, a new random number can be generated that can be added to the previous number of rounds. So, for example, if the last transmission applied the key stretching algorithm 120,124 times and the new random number is 24, then the current transmission of the credential will include a credential upon which the key stretching algorithm has been applied 120,148 times. This new credential string can then be transmitted, which is based on the same user password but differs due to the different number of algorithm iterations. Further, only the new random number will be transmitted, which can then be added to the prior number when received to, and stored by, the service provider environment. Thus, an entity intercepting the new string and new random number will be unable to accurately determine the plaintext password because the entity does not know the prior number, and thus total number, of iterations used on the plaintext password. This increases security, and enables a different version of the password to be transmitted each time, effectively rotating the password even though the user will enter the same plaintext string each time (at least until changing the user password). When the identity manager 106 receives the login request, the identity manager can apply the additional number of iterations of the algorithm on the stored version, and then compare the resulting credential to the received credential. If they are the same, then the access can be granted and the new string and number of rounds stored for subsequent login determinations.

Unlike a conventional password authentication scheme where the value stored in the server is fixed, the new auto password rotation scheme updates the stored values every time a user successfully signs in. After each key stretching performed on the client side, the stretched key and the additional iteration count information are transmitted to the server. The server then takes the stored key as input, performs the same key stretching process based on the newly received iteration count, and generates a modified key. If the modified key matches with the newly received key, login is successful. The stored key and iteration count information will also be updated accordingly. The process thus can be slightly different, as discussed, for initial signup or password change, as for user sign in. Only during initial signup or password change will the total number of iterations be transmitted with the modified credential, as subsequent transmissions will include only the additional number of rounds for the specific transmission.

The key stretching algorithm to be applied can be selected based on any of a number of different criteria, as may include security strength, computational time, and the like. It may also be desirable in some embodiments to limit the total number of iterations or rounds that can be performed on the credentials. In some embodiments there may be a fixed maximum number, and when the iterations reach or exceed this number the number is set to zero and the next transmission begins anew with a selected random number. In other embodiments the number of iterations is reset when a noticeable impact is detected on the functionality of the program, such as the code executed on the client device. In some embodiments a maximum can be set on the random number for each transmission, and a different maximum for the total number of iterations. A user repeatedly signing into an account can cause the number of iterations to increase, which can otherwise slow down the key stretching process during login and may affect user experience.

It should be mentioned that such an approach is not limited to use with passwords and other such credentials, but can be used to protect any data that is subject to brute force and leakage. Further, it is not only applicable to transmission between client and server, for example, but also applicable to transmissions among servers or any other components across at least one network connection. Further, while key stretching algorithms are discussed in various examples, other string modification algorithms can be used that can be applied iteratively and, upon knowing the number of iterations, can be used to verify submission of the original data string.

Figure 2:
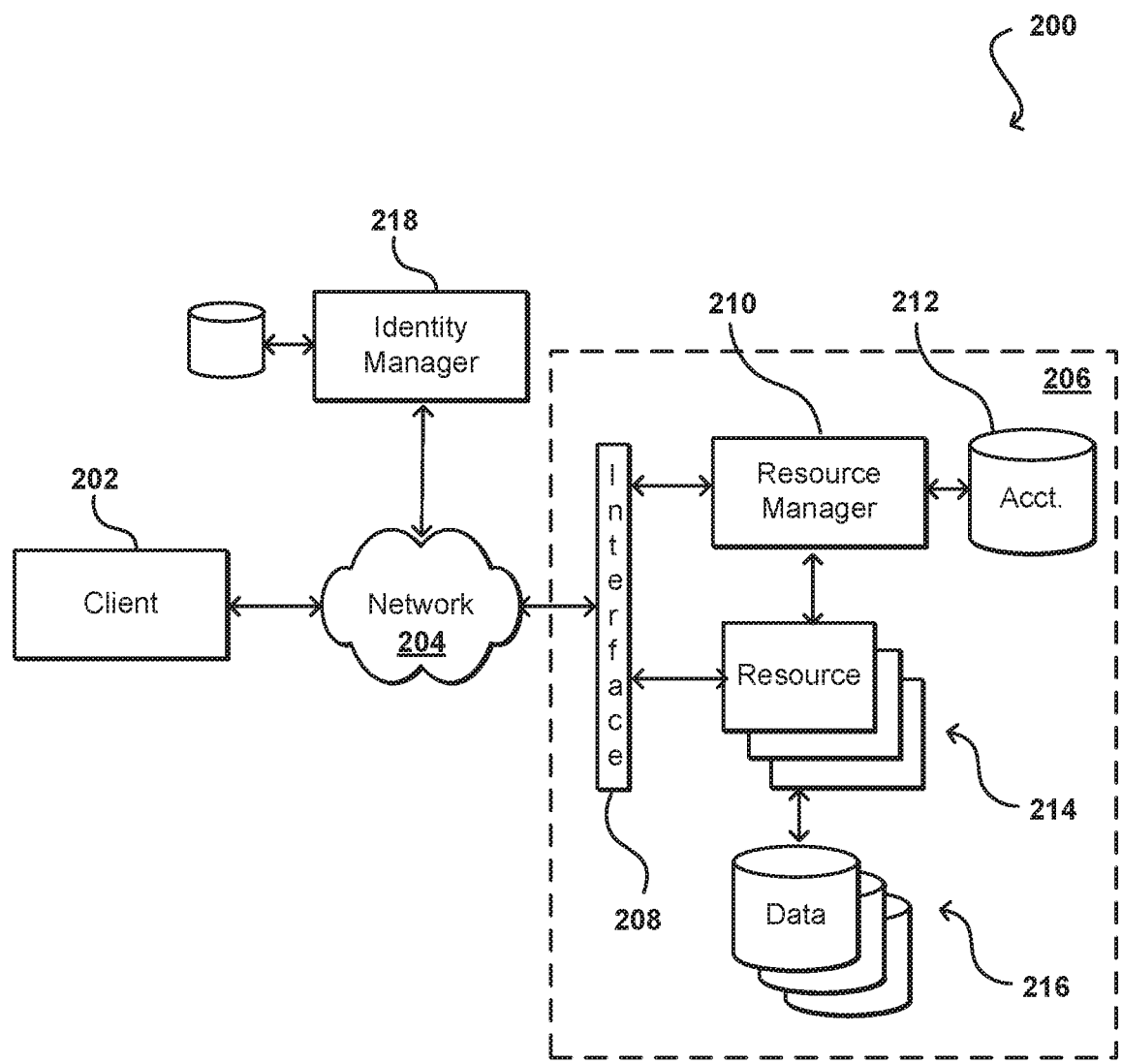
FIG. 2 illustrates an example environment in which various embodiments can be implemented.

FIG. 2 illustrates an example environment 200 in which aspects of the various embodiments can be implemented. In this example a user is able to utilize a client device 202 to submit requests across at least one network 204 to a resource provider environment 206. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 204 can include any appropriate network, including an intranet, the Internet, a cellular network, a local area network (LAN), or any other such network or combination, and communication over the network can be enabled via wired and/or wireless connections. The resource provider environment 206 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 214 of one or more types. These types can include, for example, application servers operable to process instructions provided by a user or database servers operable to process data stored in one or more data stores 216 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 214 can submit a request that is received to an interface layer 208 of the provider environment 206. The interface layer can include application programming interfaces (APIs) or other exposed interfaces enabling a user to submit requests to the provider environment. The interface layer 208 in this example can also include other components as well, such as at least one Web server, routing components, load balancers, and the like. When a request to provision a resource is received to the interface layer 208, information for the request can be directed to a resource manager 210 or other such system, service, or component configured to manage user accounts and information, resource provisioning and usage, and other such aspects. A resource manager 210 receiving the request can perform tasks such as to authenticate an identity of the user submitting the request, as well as to determine whether that user has an existing account with the resource provider, where the account data may be stored in at least one data store 212 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 218, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 206 and/or to the client device 202, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 202 to communicate with an allocated resource without having to communicate with the resource manager 210, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 210 (or another such system or service) in this example can also function as a virtual layer of hardware and software components that handles control functions in addition to management actions, as may include provisioning, scaling, replication, etc. The resource manager can utilize dedicated APIs in the interface layer 208, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 208 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, credentials provided by, or on behalf of, a user or client device can demonstrate that the source of a request for access has been authenticated, and can be used to verify that the source of the request is authorized to obtain, directly or indirectly, that access. This can include, for example, a resource or component in the resource provider environment 206 assuming a role of the user, or customer of the resource provider environment, in order to act on behalf of the user. This has the advantage to the user that a client or other component for the user can obtain access to the resources to obtain a series of tasks, without having to provide the credentials, or obtain new credentials, for every task. A potential downside, however, is that an unauthorized third party gaining access to, or a copy of, the credentials can also use them to assume the role of the user, and thus obtain similar access to the resources of the resource provider environment. It thus can be desirable in at least some situations to minimize the lifetime of these credentials in order to minimize the amount of "damage" that an unintended third party receiving the credentials can do under the assumed role or obtained access. The need to frequently obtain new credentials, however, undoes much of the benefit of the credentials having specified lifetimes in the first place, as the user would again have to frequently obtain new credentials, etc.

Accordingly, a login (or similar) process in accordance with various embodiments can involve the transmission (or execution) of a small piece of code, or other such program, if not already stored on the device. The code can act on passwords or other credentials entered into the interface by the user. The code can be executed in response to a user selecting to submit a form including the credential string, for example, before the credential string is transmitted for processing. As mentioned, the code can generate a random number, and cause a specified key stretching algorithm (e.g., a B-crypt, S-crypt, Argon2, or password-based key derivation function 2 (PBKDF2) algorithm) to process the credential string for a number of iterations corresponding to the random number, which converts the plaintext string into a strong random character string. The random number of iterations can make it harder for an attacker to brute force the password based on various key stretching algorithms. The credential that is then actually transmitted is the random character string, not the actual credential string (e.g., plaintext password). The server can then store the random character string, as well as the random number of iterations used to generate the string, which can also be transmitted from the interface. By storing such information instead of the plaintext credentials, an incident such as a TLS error or data leak can cause only the random character strings to be obtained, without the actual underlying credential.

Once the user has signed in and has an account with a service provider, for example, then subsequent login attempts by that user can involve the user entering the same plaintext password. For the subsequent attempt, another piece of code can be sent to the login page of either the mobile app or the website, if not already available, or the prior piece of code can be reused if cached on the device, among other such options. The round number that was stored for the last version of the credential can also be sent with the code snippet. After the user has entered the password through the login interface, the code will be executed to generate another random number that can be added to the prior round number that the server had just returned back to the login page. This new number can then determine the number of iterations of the key stretching algorithm to be applied to the password before transmission. The new character string can then be sent along with the new random number, not the total round number. Once received to the service provider environment, the new random number can be added to the prior round number to obtain the total round number for the new string. In this way, the total round number is not transmitted with the new string, such that an intercepting party will not be able to use the random number to recover the original plaintext password. The identity manager can then apply the new random number of rounds to the previously stored string, and can compare that string to the newly received string. The identity manager can then compare the password strings. If the password strings match up then the correct password was entered and the user can be authenticated. Again, during this entirety of the process the plain text password is never sent. The password is effectively rotated based on the new number of rounds for each transmission, even though the user enters the same user password.

As mentioned, there can be a cap on the total number of iterations to be applied, which in some embodiments can be determined based upon the performance of the system. The supplied code in some embodiments can include a benchmarking mechanism, which can determine some measure of performance of the login interface. Eventually it may be desirable to reset the number based on the benchmarking result reaching or exceeding a maximum latency or delay, among other such metrics. For example, a credential modification procedure may be allowed to take up to 500 milliseconds, after which time the rounds will be reset for the particular account. Such an approach can be beneficial as user devices will have widely varying capabilities that will change over time, so this can determine the number of rounds based on actual performance rather than some arbitrary fixed number or threshold.

Figure 3:
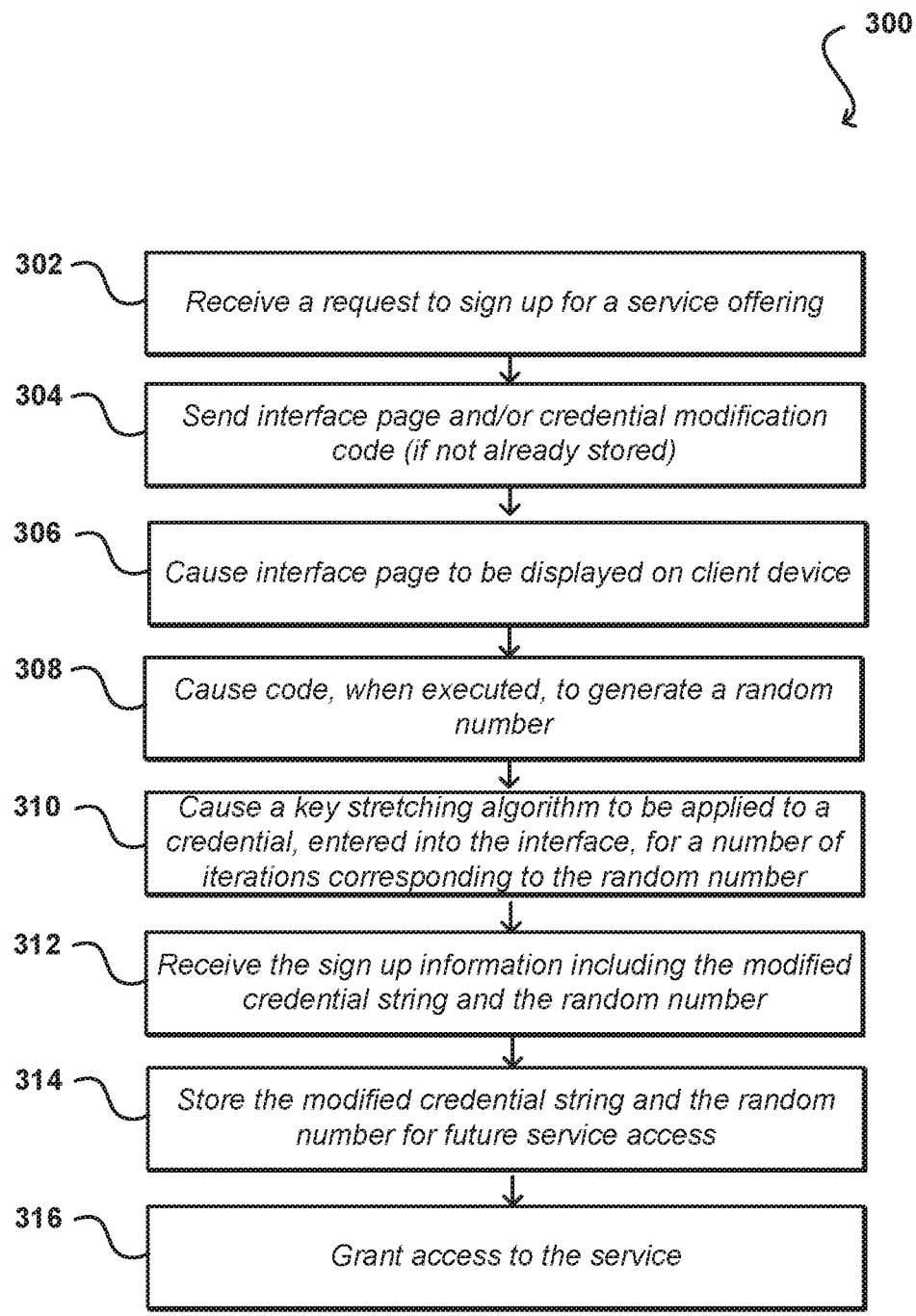
FIG. 3 illustrates an example process for securing a credential for a sign up action that can be utilized in accordance with various embodiments.

FIG. 3 illustrates an example process 300 for modifying a user credential for transmission for a sign up event that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 302 to sign up for a service offering. It should be understood that various other types of signup requests can be received for other types of offerings as well, and that the request can be received from client devices, network systems, or other such sources. In response to the request, an interface page (or other interface content) may be sent 304, along with credential modification code or other such information. It should be understood that in some embodiments at least some of the interface or credential modification code might already be stored or active on the requesting device. In this example, the interface page is caused 306 to be displayed on the requesting client device, whereby a user of the device can provide information required for the sign up. As mentioned elsewhere herein, such a process can be used for other tasks as well, such as a password rotation or migration event. At least one credential can be received through the interface executing on the client device.

The code, executing on the client device, can be caused 308 to generate a random number to be used for the credential modification. In some embodiments the number can be a random number within a specified range or up to a maximum number, among other such options. The code executing on the client device can then be caused 310 to apply a key stretching algorithm to the provided credential string for a number of rounds or iterations that corresponds to the generated random number. For example, if the random number is thirty-four then the plaintext credential string can be processed with the key stretching algorithm, and the output of that processed with the key stretching algorithm again, and so on, until the string has been modified thirty-four times per the random number. The sign up information can then be received 312 to the sign up service processor, where the information can include the modified credential string and the random number indicating the number of iterations. The modified string and random number can be transmitted together or separately in different embodiments. The modified credential string and random number can be stored 314 by the service provider environment, or an identity manager, etc., for use in authenticating future login requests. The underlying plaintext version of the credential is not stored in this environment. The access to the service can also be granted 316 according to permissions for the new user account or access corresponding to the new credentials.

Figure 4:
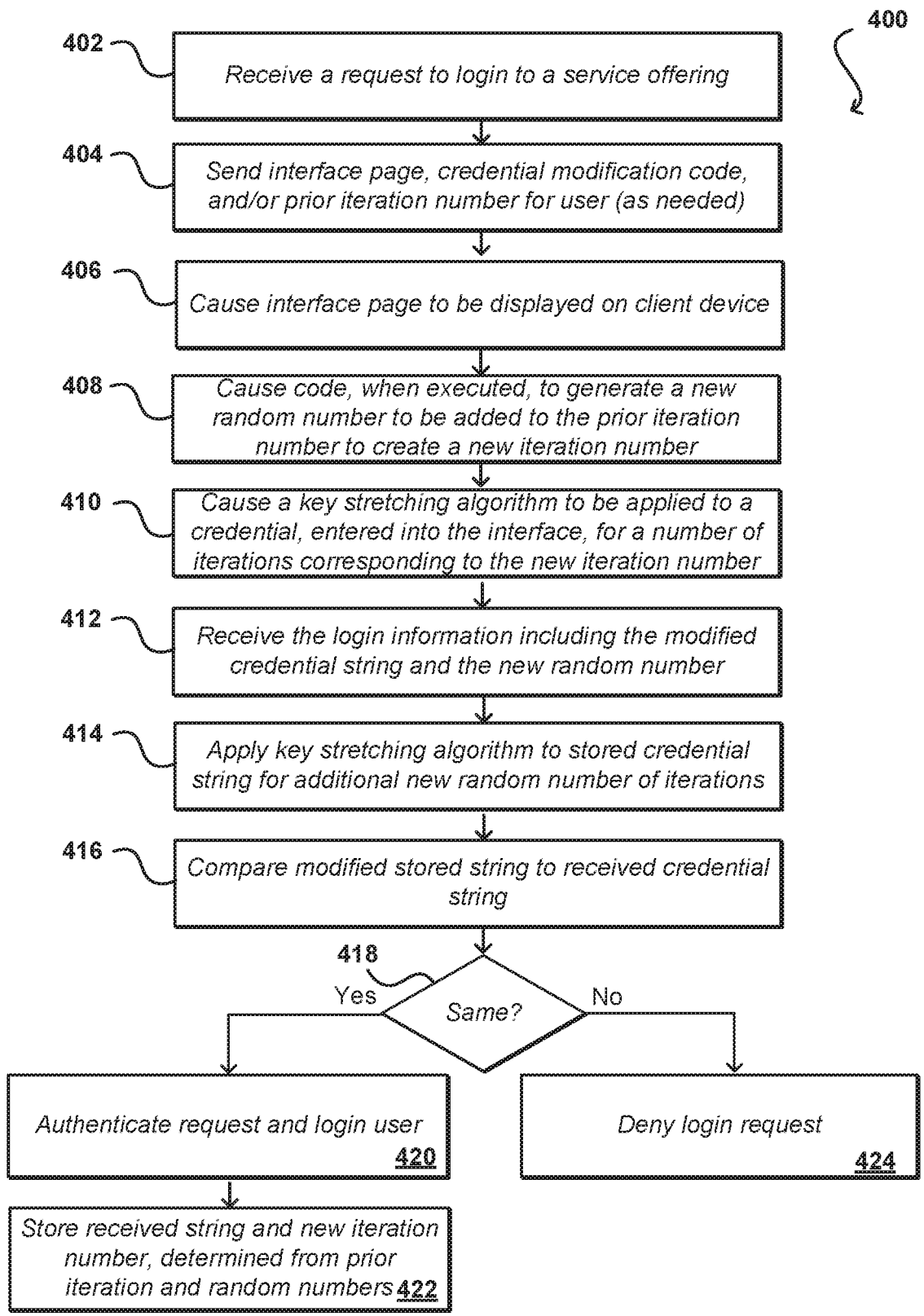
FIG. 4 illustrates an example process for securing a credential for a login action that can be utilized in accordance with various embodiments.

FIG. 4 illustrates an example process 400 for modifying a user credential for a transmission corresponding to a login event that can be utilized in accordance with various embodiments. In this example, a request is received 402 to login to a service offering, or other such offering as discussed elsewhere herein. This request can relate to an existing account for a user, and information associated with the request can provide information about the user or account. In response to the request, an interface page can be sent 404 to the client device associated with the request, or information can be sent to an existing page cached on the device, among other such options. Along with the interface page, credential modification code can be sent as well, in not already stored on the device. The user identity information can be used to determine the relevant user account, which can then be used to determine the iteration count last used to generate the modified credential string. The prior iteration number can be sent as well if needed, which can then be utilized by the client device. The credential modification can be the same as, or different from, the credential modification code sent for sign up such as discussed with respect to the example process of FIG. 3. The interface page (or other UI) can then be caused to be displayed 406 on the relevant client device. The code, when executed on the client device, can be caused 408 to generate a new random number that is separate from that generated for the initial sign up or any other login instance. Further, this number will not be the specific number of iterations to be used, but the random number will be added to the prior iteration or round number in order to generate a new round or iteration number for this login that was not used in previous login attempts (unless the count was restarted at zero, etc.). Thus, if the previous iteration number received from the identity manager was 100 and the new random number is 10 then the new iteration number for the particular login will be 110. The provided code can also cause 410 a key stretching algorithm to be applied to a received user credential, such as a plaintext password. As mentioned, the algorithm will be applied for a number of rounds or iterations corresponding to the new iteration number. Thus, a new credential string will be generated that corresponds to the new iteration number.

Once the login information (such as the user credential) is received to the interface on the client device, the new iteration number determined, and the modified credential string generated, the information can be received 412 to the identity manager or other such system or service. As mentioned, new random number will be received instead of the new iteration number, in order to provide added security. The identity manager can be part of a service provider environment or a separate system or service, among other such options. The identity manager can determine the prior iteration number and add the received new random number to determine the new iteration number that was used to generate the modified credential string. The relevant key stretching algorithm can then be applied 414 to the stored credential string for an additional number of rounds corresponding to the new random number. Since the stored string has already had the plaintext password operated on by a number of iterations corresponding to the prior iteration number, performing the additional random number of iterations will produce a modified string that has been operated on by the key stretching algorithm for a total number of iterations corresponding to the new iteration number. The modified stored string can then be compared 416 to the received credential string from the client device. If it is determined 418 that the strings are the same, then the user request can be authenticated 420 and the user logged into the service (or other such offering). The received credential string and new iteration number can then be stored 422 by the identity manager or other such system or service. If the strings are not the same, meaning that the password provided by the user was incorrect (or another error has occurred), then the login request can be denied 424. As mentioned, in some embodiments the duration of the key stretching can be monitored and if the time is too long then the iteration count can be set back to zero and a new random number used as the iteration count for the stretching, among other such options discussed and suggested herein.

Figure 5:
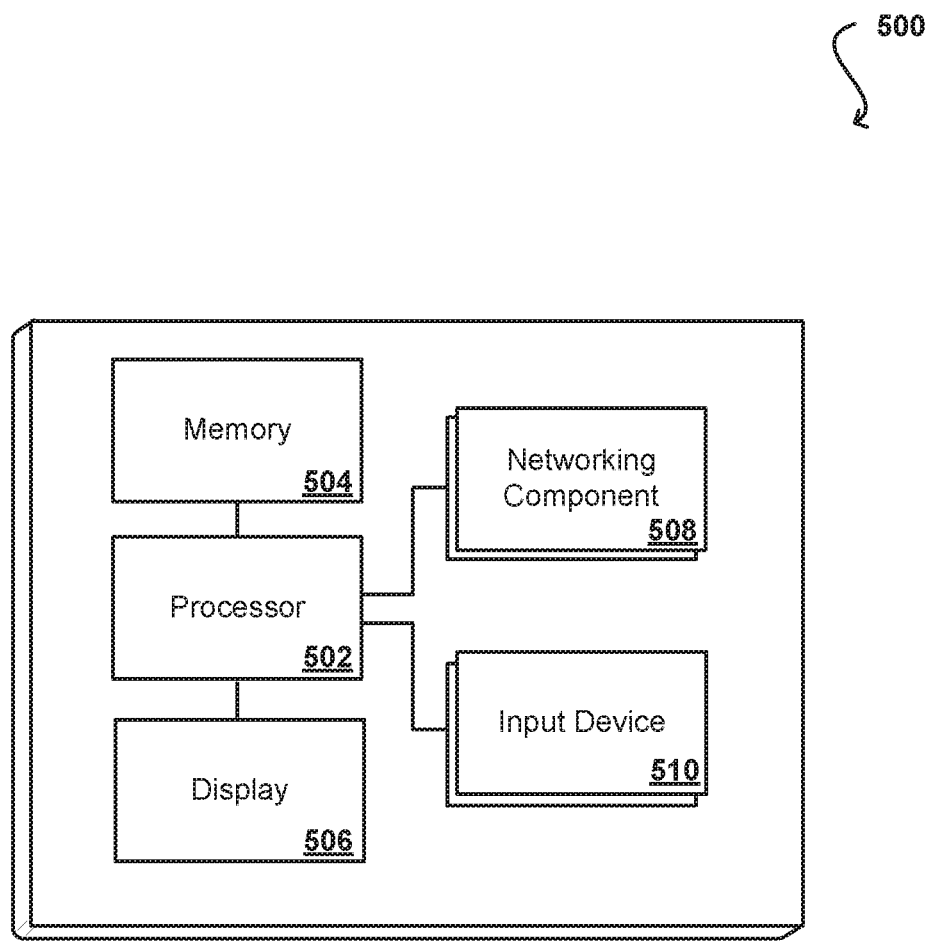
FIG. 5 illustrates example components of a computing device that can be used to implement aspects of various embodiments.

FIG. 5 illustrates a set of basic components of an example computing device 500 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 502, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a first request for access to at least one resource, the first request including a first credential string corresponding to an output of a key stretching algorithm operated on an access credential for a first number of iterations;
   receiving a second credential string, the second credential string corresponding to the output of the key stretching algorithm operated on the access credential for a second number of iterations;
   generating a local copy of the second credential string, using the first credential string processed by the key stretching algorithm for the second number of iterations;
   determining that the second credential string matches the local copy of the second credential string; and
   granting, in response to a second request, access to the at least one resource.

2. The computer-implemented method of claim 1, wherein the first iteration number corresponds to a first random number and the second iteration number corresponds to a sum of the first iteration number and a second random number, and wherein the first request further includes the first iteration number.

3. The computer-implemented method of claim 1, further comprising:
   causing a new credential string to be received for each subsequent request for access to the at least one resource, independent of whether the access credential changes with the each subsequent request for access.

4. The computer-implemented method of claim 1, wherein the access credential is an alphanumeric password, and wherein the key stretching algorithm is one of a B-crypt, an S-crypt, an Argon2, or a password-based key derivation function (PBKDF2) algorithm.

5. The computer-implemented method of claim 1, further comprising:
   providing an interface for generating the first request for access, the interface including code for generating the first credential string, and the interface indicating a string modification process to be used to generate the first credential string.

6. The computer-implemented method of claim 5, wherein the string modification process includes iterative application of a key stretching algorithm to a plaintext data security credential.

7. The computer-implemented method of claim 1, further comprising:
   providing at least one cryptographic salt for use with the key stretching algorithm.

8. A system, comprising:
   at least one processor; and
   memory including instructions that, when executed by the at least one processor, cause the system to:
   receive a first request for access to at least one resource, the first request including a first credential string corresponding to an output of a key stretching algorithm operated on an access credential for a first number of iterations;
   receive a second credential string, the second credential string corresponding to the output of the key stretching algorithm operated on the access credential for a second number of iterations;
   generate a local copy of the second credential string, using the first credential string processed by the key stretching algorithm for the second number of iterations;
   determine that the second credential string matches the local copy of the second credential string; and
   grant, in response to a second request, access to the at least one resource.

9. The system of claim 8, wherein the first iteration number corresponds to a first random number and the second iteration number corresponds to a sum of the first iteration number and a second random number, and wherein the first request further includes the first iteration number.

10. The system of claim 8, wherein the instructions, when executed, further cause the system to:
cause a new credential string to be received for each subsequent request for access to the at least one resource, independent of whether the access credential changes with the each subsequent request for access.

11. The system of claim 8, wherein the access credential is an alphanumeric password, and wherein the key stretching algorithm is one of a B-crypt, an S-crypt, an Argon2, or a password-based key derivation function (PBKDF2) algorithm.

12. The system of claim 8, wherein the instructions, when executed, further cause the system to:
provide an interface for generating the first request for access, the interface including code for generating the first credential string, and the interface indicating a string modification process to be used to generate the first credential string.

13. The system of claim 12, wherein the string modification process includes iterative application of a key stretching algorithm to a plaintext data security credential.

14. The system of claim 8, wherein the instructions, when executed, further cause the system to:
provide at least one cryptographic salt for use with the key stretching algorithm.

15. A non-transitory computer readable storage medium storing one or more sequences of instructions, executable by one or more processors, to perform a set of operations comprising:
receiving a first request for access to at least one resource, the first request including a first credential string corresponding to an output of a key stretching algorithm operated on an access credential for a first number of iterations;
receiving a second credential string, the second credential string corresponding to the output of the key stretching algorithm operated on the access credential for a second number of iterations;
generating a local copy of the second credential string, using the first credential string processed by the key stretching algorithm for the second number of iterations;
determining that the second credential string matches the local copy of the second credential string; and
granting, in response to a second request, access to the at least one resource.

16. The non-transitory computer readable storage medium of claim 15, wherein the first iteration number corresponds to a first random number and the second iteration number corresponds to a sum of the first iteration number and a second random number, and wherein the first request further includes the first iteration number.

17. The non-transitory computer readable storage medium of claim 15, further comprising instructions executed by the one or more processors to perform the set of operations of:
causing a new credential string to be received for each subsequent request for access to the at least one resource, independent of whether the access credential changes with the each subsequent request for access.

18. The non-transitory computer readable storage medium of claim 15, wherein the access credential is an alphanumeric password, and wherein the key stretching algorithm is one of a B-crypt, an S-crypt, an Argon2, or a password-based key derivation function (PBKDF2) algorithm.

19. The non-transitory computer readable storage medium of claim 15, further comprising:
providing an interface for generating the first request for access, the interface including code for generating the first credential string, and the interface indicating a string modification process to be used to generate the first credential string.

20. The non-transitory computer readable storage medium of claim 19, wherein the string modification process includes iterative application of a key stretching algorithm to a plaintext data security credential.

* * * * *